United States Patent

Melville et al.

(10) Patent No.: US 7,975,728 B2
(45) Date of Patent: Jul. 12, 2011

(54) COMPOSITE REINFORCED STRIP WINDABLE TO FORM A HELICAL PIPE AND METHOD THEREFOR

(75) Inventors: Shaun Thomas Melville, Hewett (AU);
John Gerard Taylor, Prospect (AU);
Steven David Gerald Harvey, Highbury (AU)

(73) Assignee: Sekisui Rib Loc Australia Pty Ltd. (AU)

( * ) Notice: Subject to any disclaimer, the term of this patent is extended or adjusted under 35 U.S.C. 154(b) by 791 days.

(21) Appl. No.: 11/988,636

(22) PCT Filed: Oct. 3, 2007

(86) PCT No.: PCT/AU2007/001463
§ 371 (c)(1),
(2), (4) Date: Jan. 11, 2008

(87) PCT Pub. No.: WO2008/040052
PCT Pub. Date: Apr. 10, 2008

(65) Prior Publication Data
US 2010/0132824 A1    Jun. 3, 2010

(30) Foreign Application Priority Data
Oct. 4, 2006 (AU) ................. 2006905464

(51) Int. Cl.
*F16L 11/08* (2006.01)
(52) U.S. Cl. ........ 138/154; 138/129; 138/122; 138/172; 138/173
(58) Field of Classification Search ............. 138/129, 138/154, 173, 174, 122; 264/177.17
See application file for complete search history.

(56) References Cited

U.S. PATENT DOCUMENTS

| | | | | |
|---|---|---|---|---|
| 4,209,043 A | * | 6/1980 | Menzel | 138/154 |
| 4,383,555 A | | 5/1983 | Finley | 138/154 |
| 4,435,460 A | * | 3/1984 | Menzel | 428/129 |
| 4,566,496 A | * | 1/1986 | Menzel et al. | 138/154 |
| 4,759,389 A | | 7/1988 | Woo Suck | 138/129 |
| 4,869,295 A | * | 9/1989 | Keldany | 138/129 |
| 4,928,735 A | | 5/1990 | Richards et al. | 138/154 |
| 4,977,931 A | * | 12/1990 | Menzel | 138/154 |
| 5,184,649 A | * | 2/1993 | Kanao | 138/122 |
| 7,004,202 B2 | * | 2/2006 | Bateman et al. | 138/129 |
| 7,174,922 B2 | * | 2/2007 | Bateman et al. | 138/129 |

FOREIGN PATENT DOCUMENTS

| | | |
|---|---|---|
| DE | 27 17 212 A1 | 11/1977 |
| JP | 2004-069036 | 3/2004 |
| WO | WO 88/00129 | 1/1988 |
| WO | WO 95/02779 | 1/1995 |
| WO | WO 03/089226 A1 | 10/2003 |

* cited by examiner

*Primary Examiner* — Patrick F Brinson
(74) *Attorney, Agent, or Firm* — Olson & Cepuritis, Ltd.

(57) ABSTRACT

A composite strip 10 windable to form a helical pipe for transporting fluid is disclosed. The composite strip comprises: an elongate plastic strip 11 having a base portion 12, the base portion 12 having an upper side defining an outer face 15; and at least one lengthwise extending composite rib portion 20 upstanding from the outer face 15 of the base portion 12. The rib portion 20 has a distal end 23 remote from the base portion 12. The composite rib portion comprises: an elongate inboard reinforcing member 30 disposed within or adjacent to the base portion 12; an elongate outboard reinforcing 40 member disposed within the distal end 20 of the rib portion 20 parallel to the inboard reinforcing member 30; and an elongate intermediate plastic web 23 portion extending between the inboard and outboard reinforcing members 30, 40. When wound into a helical pipe, the composite rib portion 20 reinforces the pipe against radial crushing loads.

26 Claims, 11 Drawing Sheets

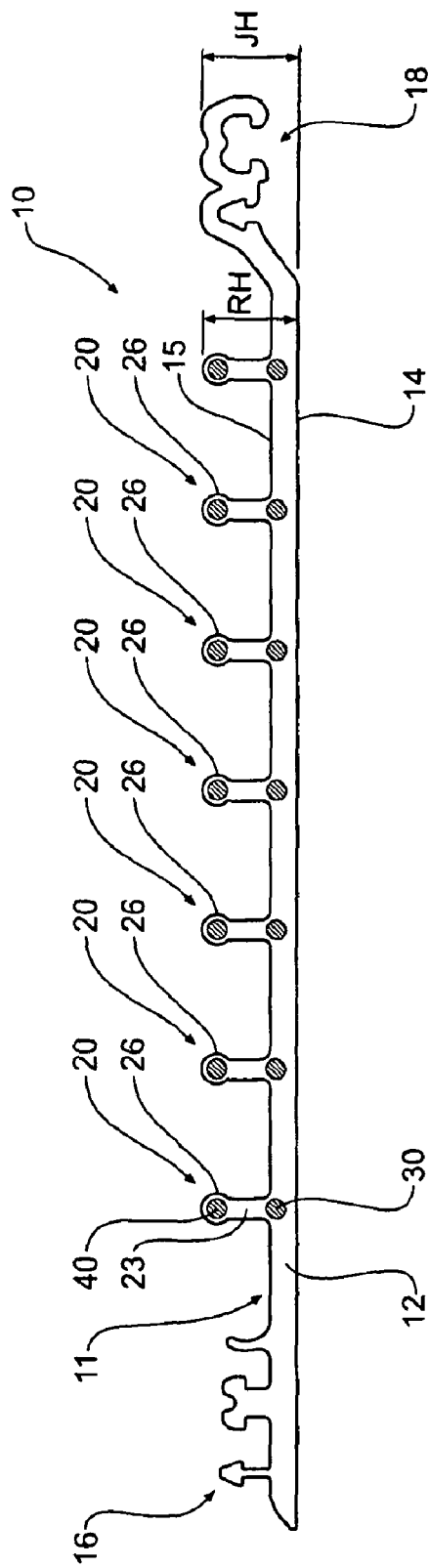
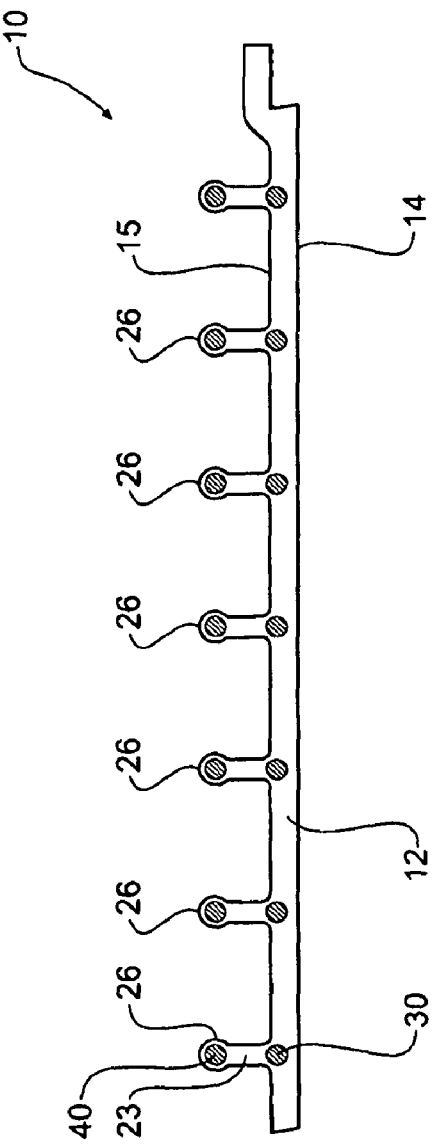

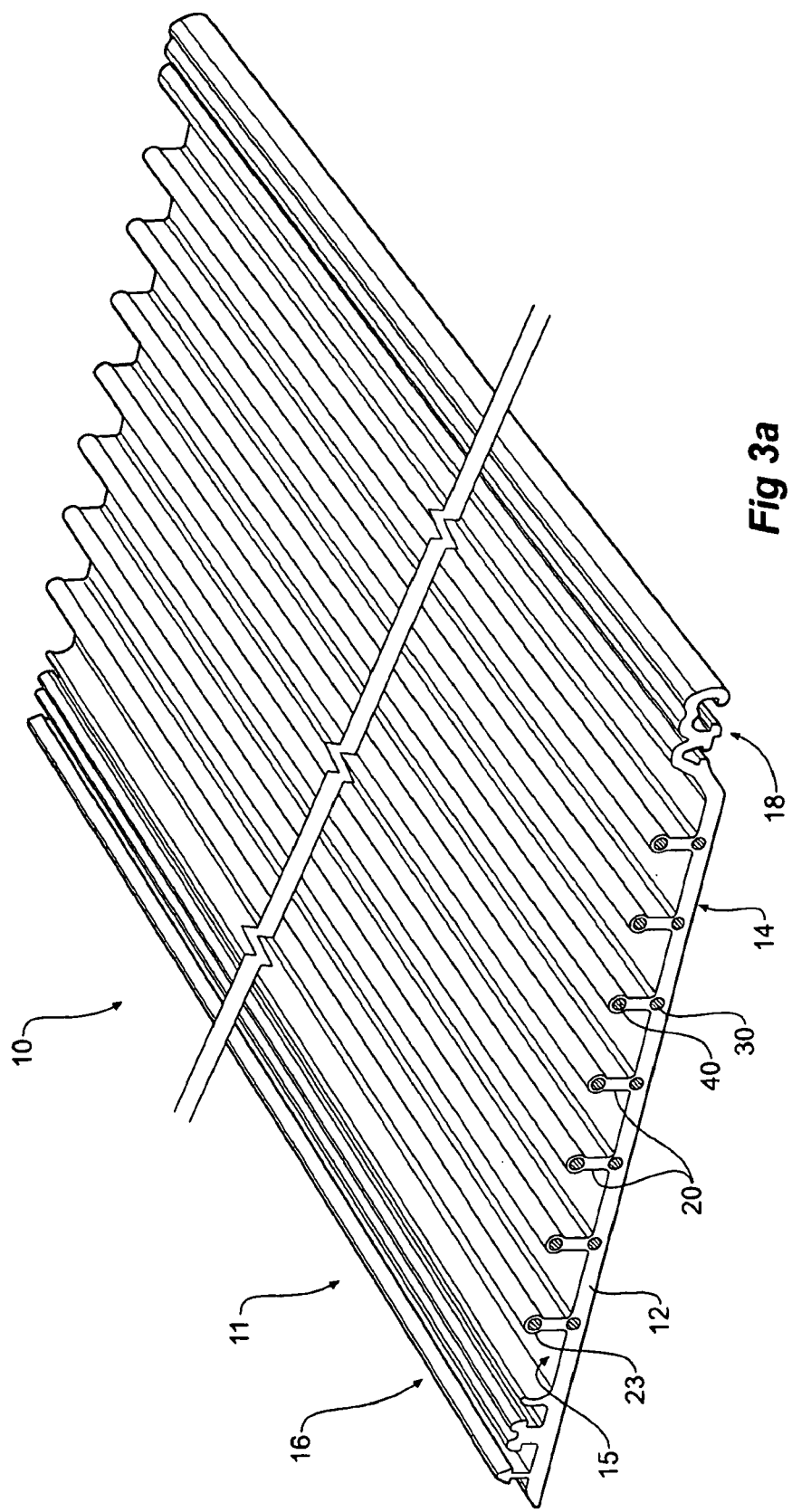

COMPOSITE REINFORCED STRIP WINDABLE TO FORM A HELICAL PIPE AND METHOD THEREFOR

This application is the National Stage of PCT/AU2007/001463, which was filed on Oct. 3, 2007 designating the United States of America, and which is incorporated herein by reference.

FIELD OF THE INVENTION

This invention relates to improvements to reinforced ribbed structures, and in particular to reinforced or strengthened helically wound pipes, tubes or conduits made from a composite of materials.

BACKGROUND

The following discussion providing some background to the invention is intended to facilitate a better understanding of the invention. However, it should be appreciated that the discussion is not an acknowledgment or admission that any of the material referred to was published, known or part of the common general knowledge as at the priority date of the application.

It is known that plastic pipes can be made by helically winding a plastic strip having a series of spaced apart upstanding ribs extending longitudinally of the strip, either at room temperature or at an elevated temperature where the plastic becomes more flexible. This form of helically wound tube is already known in the piping industry and is described in Patents by the applicant relating both to the form of the plastic strip, the form of the tube and the form of the machine by means of which the pipes or tubes are produced from such strips.

For these pipes to perform in a high performance applications, in order to attain the necessary degree of strength, the wall thickness of the plastic strip must be quite substantial, as well as that of the ribs. Alternatively the finished pipes or tubes can be reinforced with strengthening or reinforcing members.

In applications where the reinforced tubes or pipes are buried in a trench or subjected to high earth loads, the strength of the pipe or tube is of extreme importance.

The applicant's Australian Patent No. AU607431 discloses a method of producing a reinforced plastic tube utilising a reinforcing member placed between the ribs in such a manner that the deflection resistance of the finished pipe or tube is materially increased. The reinforcing member comprises a metal member having a profile of U-shape cross-section, the free ends of the reinforcing member being designed to engage beneath opposed flange formations of a pair of adjacent ribs to thereby lock the metal strip in position between the ribs and in turn stiffen the ribs and the finished pipe.

The applicant's Australian Patent No. AU661047 discloses an improvement over the disclosure of Australian Patent No. AU607431 referred to above. The improvement is provided by the provision of a reinforcing member having a central body portion of inverted U or V-shaped cross-section that has a radial height greater than the height of the ribs whereby the effective external diameter of the composite pipe is substantially increased. This provides a stiffer pipe.

The applicant's Australian Patent No. AU2003227090 discloses a further improvement over the disclosure of Australian Patent No. AU661047 referred to above. The improvement is provided by the provision of a reinforcing member having height to thickness ratio of at least 3:1 and orientated substantially perpendicular to the base of the strip. The inner face of the strip forms a continuous surface below the reinforcing strip. The provision of the aforementioned reinforcing strip reinforces the pipe against radial crushing loads in a more efficient way than prior art reinforcement, while the inner face provides a smooth internal pipe surface and separates the reinforcing strip from the fluid within the pipe.

Prior to commercialisation of applicant's Australian Patent No. AU2003227090, helically wound composite pipes were formed in a multi-stage operation. The plastic body was extruded and then was helically wound to form a pipe. Elongate steel reinforcing members were separately roll-formed into a profile providing the required stiffness (such as the inverted U or V-shaped profiles referred to above). The roll formed steel profile was then rolled to a radius approximating that of the helically wound plastics body. Finally, the profiled and radiused reinforcing member or members were wound on to the outside of the plastics pipe to form a composite pipe of the requisite stiffness.

When using the reinforcing members disclosed in Australian Patent Nos AU607431 and AU661047, the step of rolling the steel reinforcing member to a radius of approximating that of the plastics pipe involved straining the steel reinforcing member beyond its elastic limit. This required the application of considerable force during the rolling process. In contrast, winding of the extruded plastics profile into a helical pipe generally requires much less force due to the material properties of the plastics. Using the composite profile of the applicant's Australian Patent No. AU2003227090 it became possible to wind a preformed steel and plastic composite strip directly into a pipe from a spool of composite profile.

An object of the present invention is to provide certain improvements, beyond those disclosed in the aforesaid Patent Specifications AU607431, AU661047 and AU2003227090, to strips windable into reinforced helically wound plastics tube or pipe and to pipes wound from such strips.

SUMMARY OF THE INVENTION

According to a first aspect of the invention there is provided a composite strip windable to form a helical pipe for transporting fluid, the composite strip comprising:

an elongate plastic strip having a base portion, the base portion having a lower side defining an inner face and an upper side defining an outer face;

at least one lengthwise extending rib portion upstanding from the outer face of the base portion, the rib portion having a distal end remote from the base portion;

an elongate inboard reinforcing member disposed within or adjacent to the base portion;

an elongate outboard reinforcing member disposed within the distal end of the rib portion parallel to the inboard reinforcing member; and an elongate intermediate plastic web portion extending between the inboard and outboard reinforcing members, the web portion together with the inboard and outboard reinforcing members forming a composite rib portion, wherein, when wound into a helical pipe, the composite rib portion reinforces the pipe against radial crushing loads.

Preferably the outboard reinforcing member is constructed from a material having a higher Young's Modulus than that of the plastic strip and wherein the inboard reinforcing member is constructed from a material having a higher Young's Modulus than that of the plastic strip.

Preferably the inboard and outboard reinforcing members are completed encapsulated.

Preferably the reinforcing members are stranded or non-stranded filaments.

Preferably the reinforcing members are wire.

Preferably the composite strip includes a plurality of lengthwise extending composite rib portions upstanding from the outer face of the base portion.

Preferably the composite strip includes connecting formations on opposite edges thereof, the connecting formations adapted to interlock when the strip is wound in a helical path and adjacent edge portions of the strip overlap one another.

Preferably for each composite rib portion, a distance measured from the inner face of the strip upwards to a distal end of the composite rib portion is no greater than a distance measured from the inner face of the strip upwards to an apex of the connecting formations.

Preferably the strip has first and second elongate outboard reinforcing members disposed within the distal end of the rib portion positioned laterally offset to first and second sides respectively of a plane bisecting the rib portion perpendicularly to the base.

According to a second aspect of the invention there is provided a composite strip windable to form a helical pipe for transporting fluid, the composite strip comprising:

an elongate plastic strip having a base portion, the base portion having a lower side defining an inner face and an upper side defining an outer face;

at least one lengthwise extending rib portion upstanding from the outer face of the base portion, the rib portion having a distal end remote from the base portion;

an elongate inboard reinforcing member disposed within or adjacent to the base portion;

first and second elongate outboard reinforcing members disposed within the distal end of the rib portion parallel to the inboard reinforcing member and positioned laterally offset to first and second sides respectively of a plane bisecting the rib portion perpendicularly to the base; and an elongate intermediate plastic web portion extending between the inboard and outboard reinforcing members, the web portion together with the inboard and outboard reinforcing members forming a composite rib portion, wherein, when wound into a helical pipe, the composite rib portion reinforces the pipe against radial crushing loads.

Preferably the outboard reinforcing member is constructed from a material having a higher Young's Modulus than that of the plastic strip and wherein the inboard reinforcing member is constructed from a material having a higher Young's Modulus than that of the plastic strip.

Preferably the inboard and outboard reinforcing members are completed encapsulated.

Preferably the reinforcing members are stranded or non-stranded filaments.

Preferably the reinforcing members are wire.

Preferably the composite strip includes a plurality of lengthwise extending composite rib portions upstanding from the outer face of the base portion.

Preferably the composite strip includes connecting formations on opposite edges thereof, the connecting formations adapted to interlock when the strip is wound in a helical path and adjacent edge portions of the strip overlap one another.

Preferably for each composite rib portion, a distance measured from the inner face of the strip upwards to a distal end of the composite rib portion is no greater than a distance measured from the inner face of the strip upwards to an apex of the connecting formations.

According to a third aspect of the invention there is provided a pipe comprising a helically wound composite strip, the composite strip comprising:

an elongate plastic strip having a base portion, the base portion having a lower side defining an inner face and an upper side defining an outer face;

at least one lengthwise extending rib portion upstanding from the outer face of the base portion, the rib portion having a distal end remote from the base portion;

an elongate inboard reinforcing member disposed within or adjacent to the base portion;

an elongate outboard reinforcing member disposed within the distal end of the rib portion parallel to the inboard reinforcing member; and an elongate intermediate plastic web portion extending between the inboard and outboard reinforcing members, the web portion together with the inboard and outboard reinforcing members forming a composite rib portion, wherein the composite rib portion reinforces the pipe against radial crushing loads.

Preferably the composite strip has first and second elongate outboard reinforcing members disposed within the distal end of the rib portion positioned laterally offset to first and second sides respectively of a plane bisecting the rib portion perpendicularly to the base.

According to a fourth aspect of the invention there is provided a method of producing a pipe comprising the steps of:

a) extruding an elongate plastics strip, the strip having a base portion, the base portion having a lower side defining an inner face and an upper side defining an outer face, and at least one lengthwise extending rib portion upstanding from the outer face of the base portion;

b) introducing a lower reinforcing member into the base portion of the strip in a position adjacent to the at least one rib portion so as to form a sub-assembled composite strip;

c) winding the sub-assembled composite strip into a spool of strip or into a helically wound pipe;

d) introducing an upper reinforcing member into a top portion of the at least one rib portion so as to form an assembled composite strip, whereby the step of introducing a lower reinforcing member occurs during or after the extruding step but before the winding step and whereby the step of introducing the upper reinforcing member occurs during or after the winding step.

Preferably the extruding and the introducing step b) occur together in a cross-head extrusion die.

Preferably the winding step c) comprises winding the sub-assembled composite strip into a pipe.

Preferably the introducing step d) includes tensioning the outer reinforcing member such that the pipe is prestressed.

Preferably the method further comprises the step of sealing the upper reinforcing member within the top portion of the at least one rib.

According to a fifth aspect of the invention there is provided a method of producing a pipe comprising the steps of:

a) extruding an elongate plastics strip, the strip having a base portion, the base portion having a lower side defining an inner face and an upper side defining an outer face, and at least one lengthwise extending rib portion upstanding from the outer face of the base portion, the rib portion having a distal end remote from the base portion;

b) introducing a lower reinforcing member into the base portion of the strip in a position adjacent to the at least one rib portion so as to form a sub-assembled composite strip;

c) bending the composite strip about an axis transverse to the base;

d) introducing an upper reinforcing member into the distal end of the at least one rib portion so as to form an assembled composite strip, whereby the step of introducing a lower reinforcing member occurs during or after the extruding step but before the bending step and whereby the step of introducing the upper reinforcing member occurs during or after the bending step.

According to a sixth aspect of the invention there is provided a method of producing a pipe comprising the steps of:

a) extruding an elongate plastics strip, the strip having a base portion, the base portion having a lower side defining an inner face and an upper side defining an outer face, and at least one lengthwise extending rib portion upstanding from the outer face of the base portion, the rib portion having a distal end remote from the base portion;

b) introducing a first reinforcing member into either of: the base portion of the strip in a position adjacent to the at least one rib portion, or the distal end of the at least one rib portion so, as to form a sub-assembled composite strip;

c) bending the composite strip about an axis transverse to the base;

d) introducing a second reinforcing member into the other of: the base portion of the strip in a position adjacent to the at least one rib portion, or the distal end of the at least one rib portion so as to form an assembled composite strip, whereby the step of introducing a first reinforcing member occurs during or after the extruding step and whereby the step of introducing the second reinforcing member occurs during or after the bending step.

Specific embodiments of the invention will now be described in some further detail with reference to and as illustrated in the accompanying figures. These embodiments are illustrative, and are not meant to be restrictive of the scope of the invention.

DETAILED DESCRIPTION OF PREFERRED EMBODIMENTS OF THE INVENTION

Embodiments of the invention are illustrated in the accompanying representations in which:

FIG. 1a shows a cross-sectional view of a composite strip according to an embodiment of the invention.

FIG. 1b is a similar view to that of FIG. 1a but shows alternative edge arrangements for joining adjacent convolutions of the strip.

FIGS. 3a and 3b are isometric views of the profiles of FIGS. 1 and 1b respectively.

FIG. 7a is an enlarged view of the composite rib portion of the composite strip.

FIG. 8b shows a cross-sectional view of a composite strip according to a further embodiment of the invention, that composite strip being the same strip illustrated in FIG. 7a.

Figure 2:
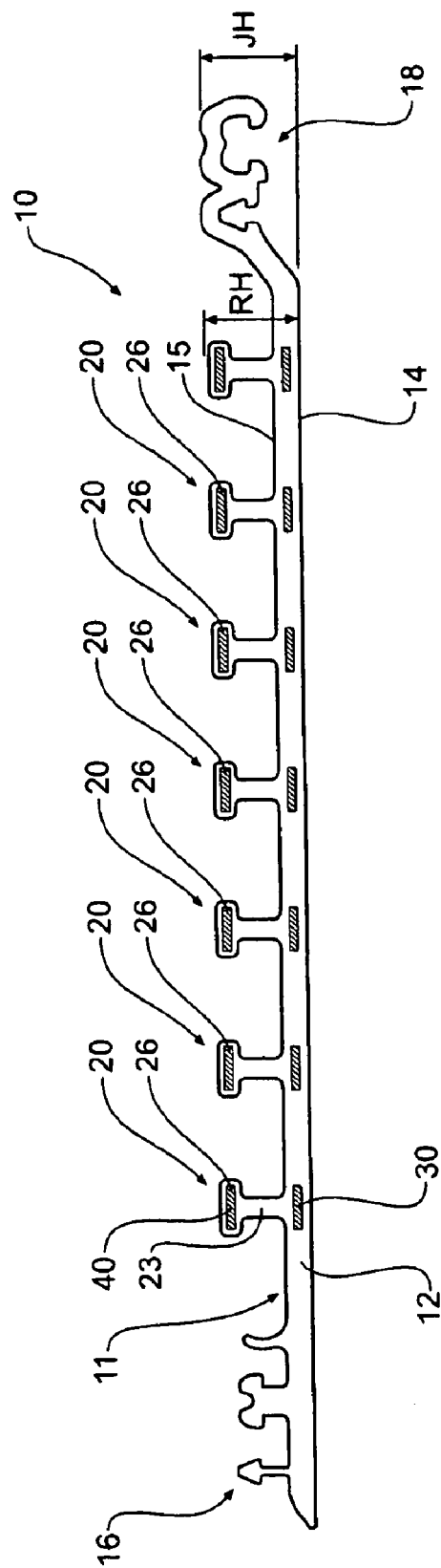
FIG. 2 shows an alternative embodiment of the invention.

Referring to FIG. 1a, an elongate composite strip 10 that is windable to form a helical pipe is shown. The composite strip 10 comprises an elongate plastic strip 11 and a pair of parallel spaced apart reinforcing members 30 and 40 separated by an intermediate plastic web portion 23. The plastic used for this embodiment of the invention is polyvinyl chloride (PVC) although other suitable plastics may be used including polyethylene.

The plastic strip 11 has a base portion 12 with a substantially flat inner face 14. A plurality of length-wise extending composite rib portions 20 project upward from the base portion 12. Each rib portion 20 has a distal end 26 remote from the base portion. In this embodiment, each composite rib portion 20 comprises an inboard reinforcing member 30 disposed within the base portion 12; an outboard reinforcing 40 member disposed within the distal end of the rib portion parallel to the inboard reinforcing member 30; and an intermediate plastic web portion 23 extending between the inboard and outboard reinforcing members 30 and 40.

The intermediate plastic web portion 23 holds the inboard and outboard reinforcing members 30 and 40 apart. This is particularly important in bending as it produces a much more effective stiffener than otherwise would be provided. For instance when the profile is wound into a helical pipe, the separation of the inboard and outboard reinforcing members 30 and 40 greatly strengthens the pipe against radial crushing loads as compared to a similar pipe with similar reinforcing members that are not spaced apart in a radial direction.

The reinforcing members 30 and 40 shown in FIG. 1a and FIG. 1b has a substantially circular cross-section. These reinforcing members may be solid wire or stranded wire for instance.

An alternative embodiment of the invention is shown in FIG. 2. With this embodiment, the reinforcing members 30 and 40 have a substantially rectangular cross-sectional shape. The reinforcing members 30 and 40 of FIG. 2 could be strips of steel or aluminum. The resulting composite rib portions 20 have the appearance and function similar to "I" beams. These composite ribs offer significant efficiency advantages over the composite ribs disclosed by the applicants earlier Australia Patent Application No. AU2003227090 referred to above.

The composite rib portions 20 illustrated in FIGS. 1a, 1b and 2 are more efficient than the composite ribs of the aforementioned earlier application. Furthermore, equivalent stiffness can be provided with an overall rib height as indicated by the double headed arrow RH in FIG. 2 significantly less than would otherwise be required. This has a number of advantages. For instance, in the application of pipe rehabilitation where a pipe may be wound within a host pipe, the resultant internal diameter of the newly wound pipe may be greater using the composite strip of FIGS. 1a, 1b or 2 as compared to the composite strip of the aforementioned application.

Figure 9:
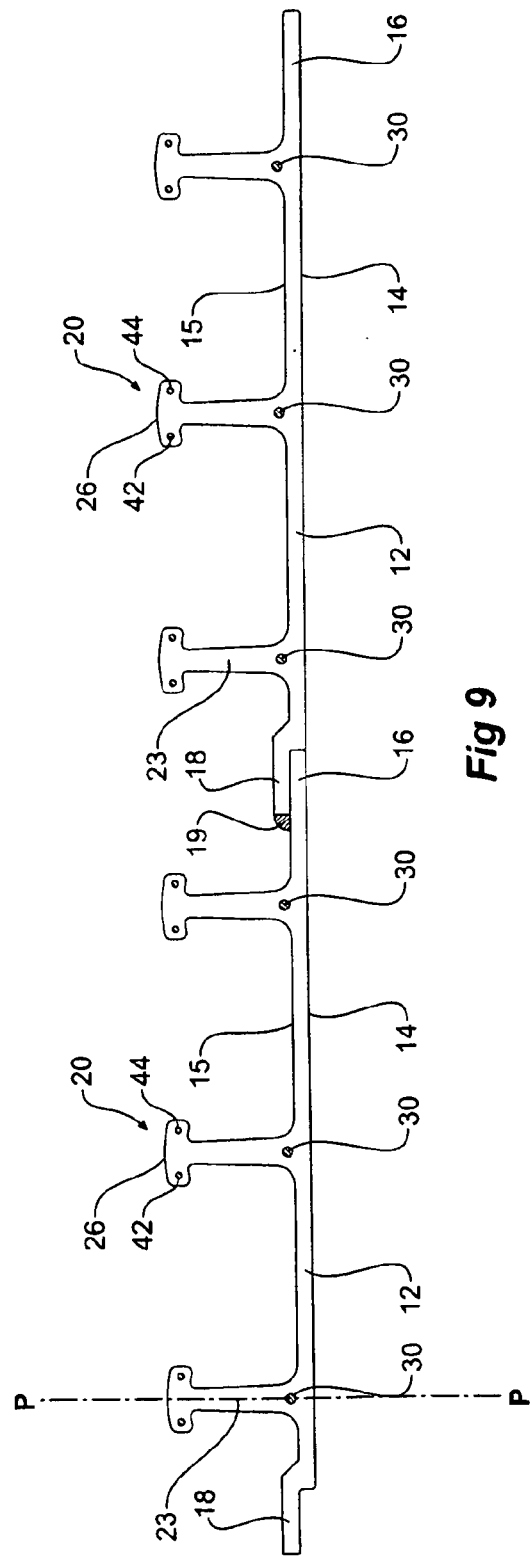
FIG. 9 is a cross-sectional view showing two convolutions of a composite strip according to a further embodiment of the invention.
Figure 10A:
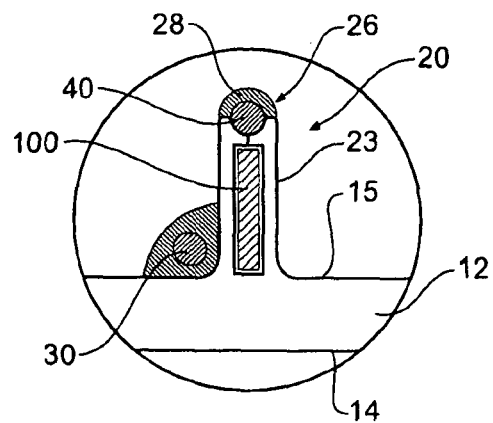
FIGS. 10a, 10b, 10c and 10d are enlarged views similar to the enlarged view of FIG. 7a, but show further alternative composite rib portions 20.
Figure 10B:
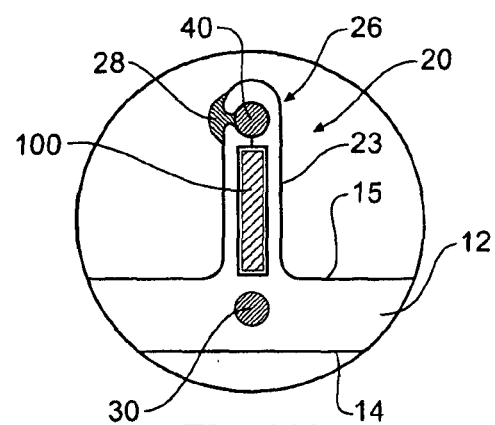
Figure 10C:
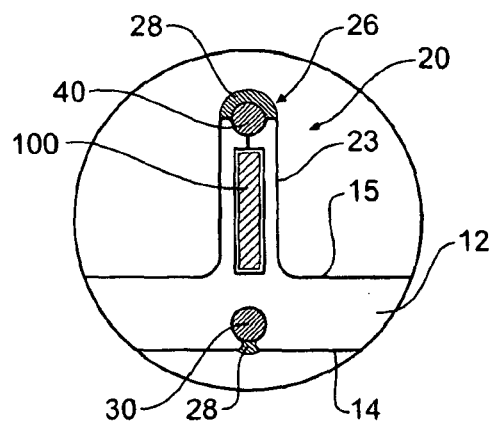
Figure 10D:
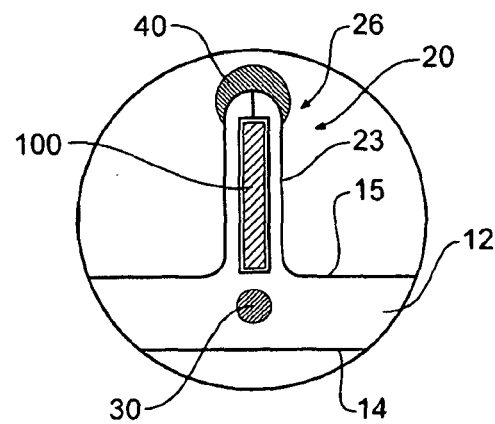

The outboard reinforcing members of both FIGS. 1a and 1b lie directly over their corresponding inboard reinforcing members in a lateral direction. In another embodiment of the invention (for instance as shown in FIG. 9) the inboard and/or outboard reinforcing members may comprise multiple members and the centre of the outboard multiple reinforcing members (for instance) may lie directly over its corresponding inboard reinforcing member(s) in a lateral direction. The purpose of centring over the inboard reinforcing member(s)

in a lateral direction is to provide a balanced load and to reduce the tendency of the composite rib portions to collapse sideways under a radial crushing load.

In some applications it may be advantageous to match the rib height RH as indicated in FIG. 2 to the height of the edge joining features as indicated by the double headed arrow labeled JH in FIG. 2.

With the profile shown in FIG. 1a, both the inboard and outboard reinforcing members 30 and 40 are completely encapsulated by plastic. This is particularly advantageous where the reinforcing members 30 and 40 are made from materials subject to corrosion (for instance steel).

Referring to FIG. 1b, a composite strip 10 similar to that shown in FIG. 1a is shown. The difference between the strips 10 of FIG. 1a and FIG. 1b are in the area of the edges 16 and 18. The edge details of FIG. 1a provide a mechanical interlock between adjacent convolutions of the wound strip. In contrast, the edges of the profile in FIG. 1b provide for a welded or fused joint between adjacent convolutions of the strip.

Fusing of the edges of the profile shown in FIG. 1a can be achieved by solvent jointing as is commonly used in joining PVC pipes. Other joining means including welding and gluing may be suitable for PVC, polyethylene and other materials.

Various materials can be used for the inboard and outboard reinforcing members. Examples of materials that could be used for either the inboard or outboard reinforcing members include steel, stainless steel, aluminium, other metals, natural fibres, kevlar, synthetic fibres and high-strength plastics. For example, as shown in FIG. 7f, a high-strength polymer can be welded directly on to the top of the rib.

In some applications it may be advantageous to precoat the reinforcing members. For instance, wire may be coated with PVC to help with bonding to the ribs of the composite strip. Wire in some applications will be coated to prevent corrosion for instance by galvanising. Polyethylene coated nylon cores that could be welded without damaging the internal fibres may also be suitable in some applications as reinforcing members.

In some applications it may be advantageous to serrate the surface of the reinforcing members to assist with the mechanical interlocking between the members and the surrounding plastic strip.

The reinforcing members may be twisted, braided, stranded, plaited or pre-processed by other means to give beneficial elongation or other properties.

The reinforcing members may be preheated to improve the bond strength between the members and the surrounding strip. Preheating the steel reduces the rapid cooling of the extruded plastic and reduces the brittleness of the material at that point.

The outboard reinforcing member in some applications may be different from the inboard reinforcing member. For instance, under some loading conditions it is only necessary for the outboard reinforcing member to be strong in tension (or have a high Young's modulus in tension) and it is only necessary for the inboard reinforcing member to be strong in compression (or have a high Young's modulus in compression). Natural fibres are strong in tension but are poor in compression and therefore may be suitable for the outer reinforcing member or members but not for the inner reinforcing member or members. Also, in some applications, the outboard reinforcing member may be more susceptible to degradation from corrosion, and in such circumstances this member could be a corrosion resistant material such as aluminium.

In many underground applications, the reinforcing members may alternate between tension and compression within each convolution of composite strip forming the helically wound pipe.

In the embodiments of the invention shown in FIGS. 1a and 1b, an array of seven lengthwise extending rib portions 20 spaced apart across the width of the strip are provided. In other embodiments in the invention more or less rib portions 20 may be provided.

Figure 3B:
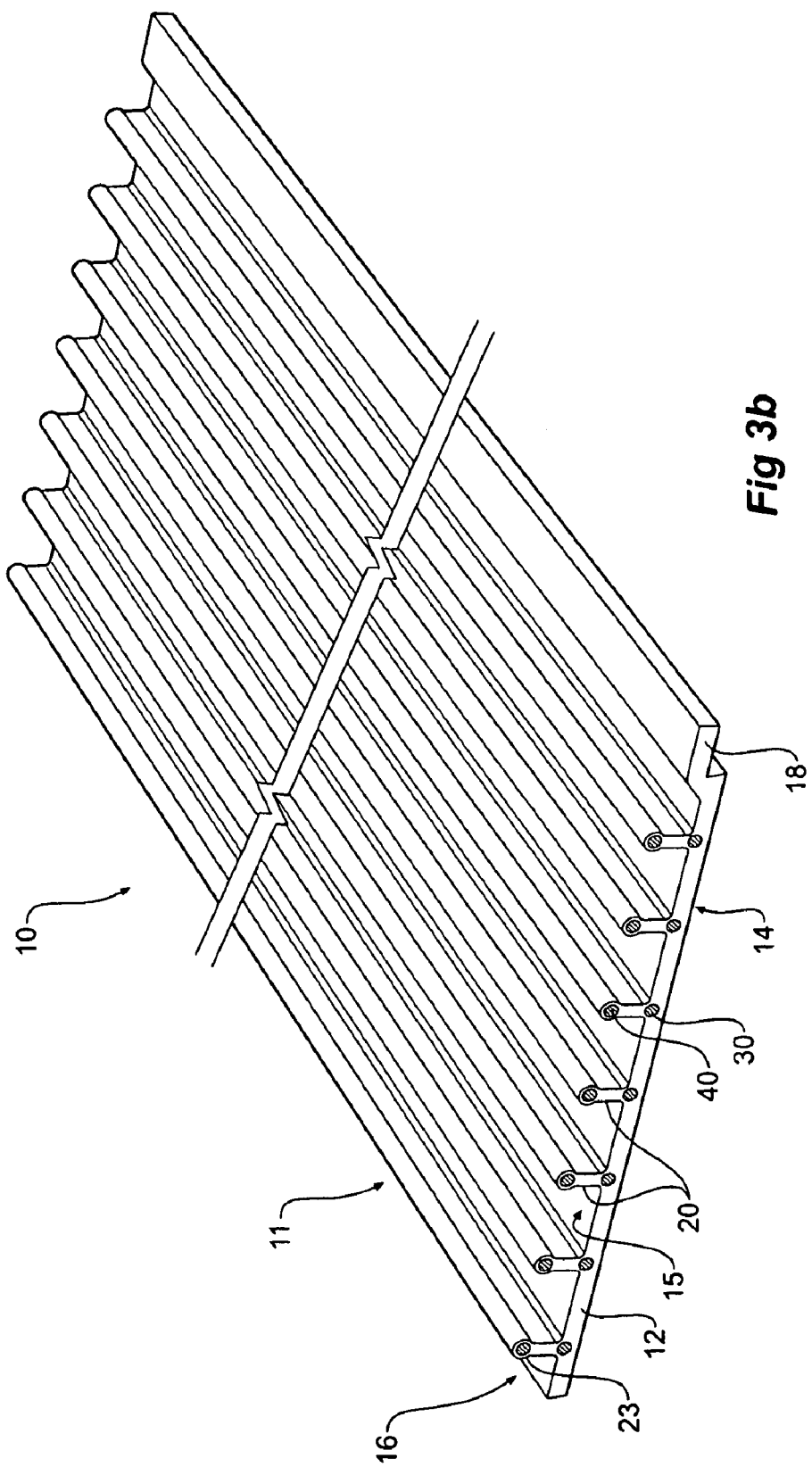
Figure 4:
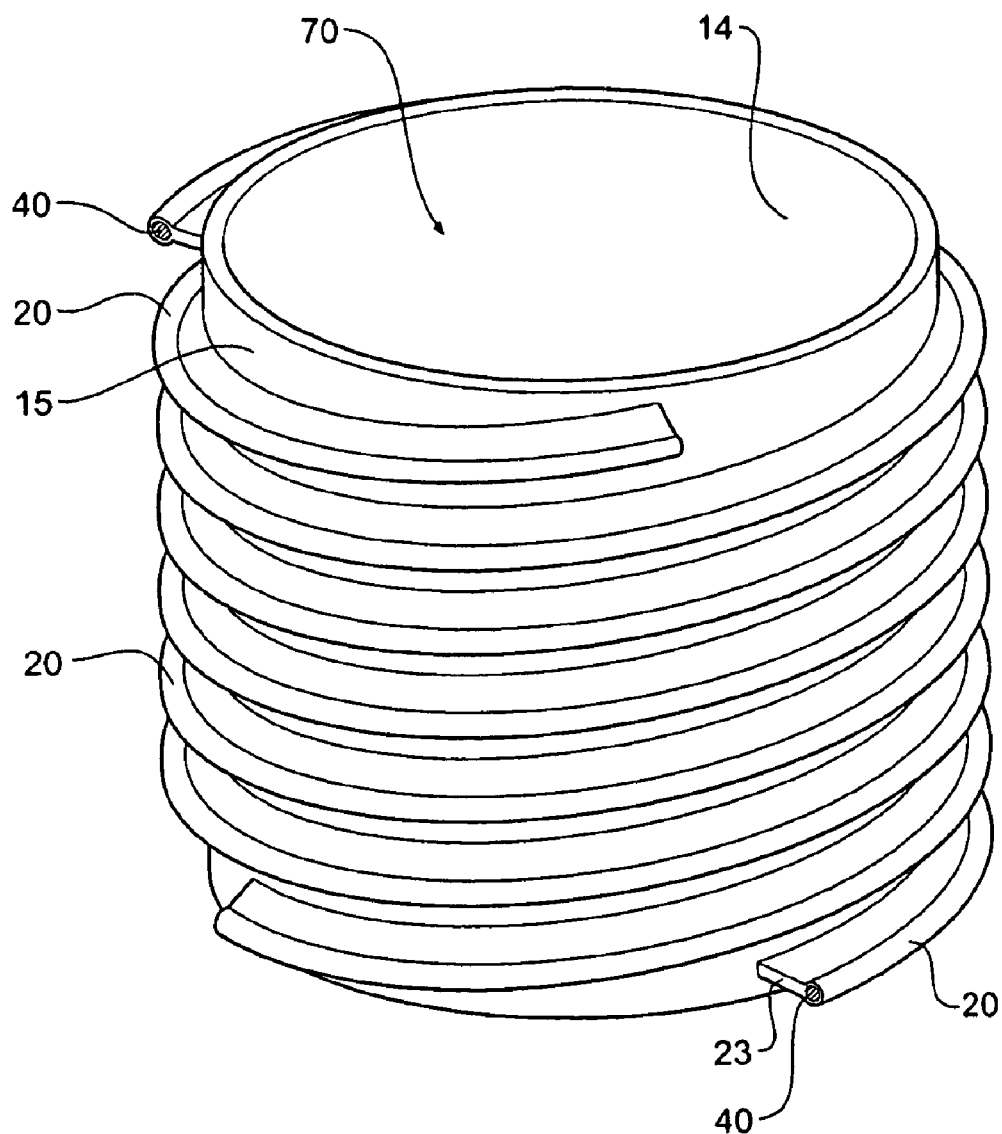
FIG. 4 is an isometric view of a pipe wound from the profile of FIG. 1b.

Referring to FIG. 4, a helically wound composite pipe 70 produced by helically winding the composite strip shown in FIGS. 1b, 2 and 3 is shown. Comparing FIGS. 1b and 4, it is apparent that the orientation of the reinforcing members 30 and 40 with respect to the flat side 14 of the base portion 12 remains substantially unchanged after the winding of the strip to form the pipe 70. The intermediate plastic web portions 23 provide support for the reinforcing strips 20 and 30 during the winding of the strip 10. During winding of the strip 10 to form a helical pipe, the reinforcing members 30 and 40 are bent about an axis substantially transverse to the strip 10.

The strip profiles shown in FIGS. 1a, 1b, 2a and 2b keep the mass of the profile to a minimum while at the same time maintaining the performance criteria required for a broad range of applications to ensure material costs are minimised.

Figures 7A, 7B:
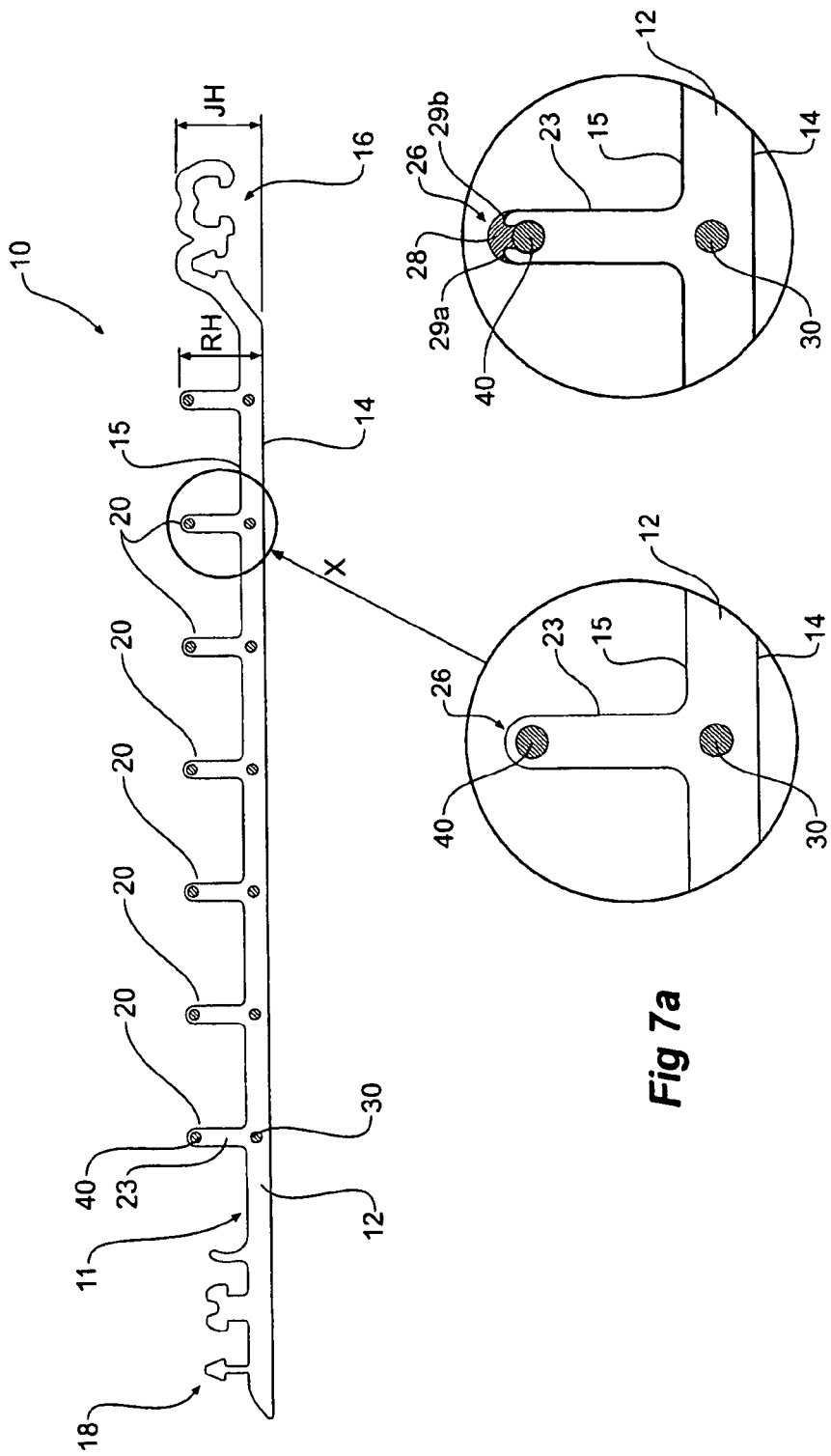
FIG. 7a shows a cross-sectional view of a composite strip according to a further embodiment of the invention. Included within
FIG. 7b is an enlarged view similar to the enlarged view of FIG. 7a but shows an alternative composite rib portion 20.

FIG. 7a shows a further embodiment of the invention similar to that shown in FIG. 1a. With this embodiment of the invention, the ribs 20 are a less complex shape having simple parallel walls and the inboard and outboard reinforcing members have a smaller diameter. It should be appreciated that many other variations are possible and that the web portion 23 may have different shapes and thicknesses depending on specific design parameters that are required to be achieved. The profile or composite strip shown in FIG. 7a can be produced by a crosshead extrusion process.

Figure 7C:
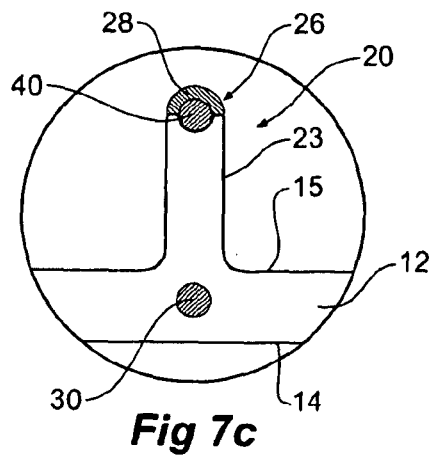
FIGS. 7c, 7d, 7e, 7f, 7g and 7h show further alternative composite rib portions.
Figure 7D:
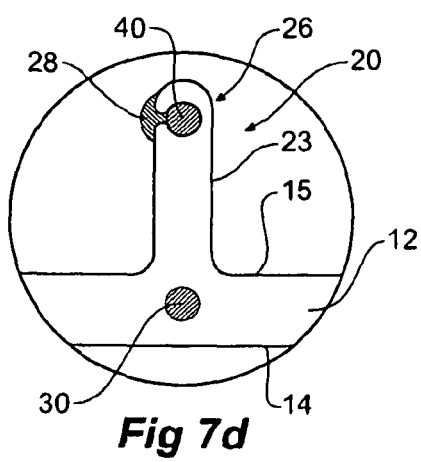

Referring now to FIGS. 7b, 7c and 7d, the enlarged views are shown of variants of the rib area 20. For instance, in FIG. 7b an upwardly opening mouth is formed between projections 29a and 29b extending from the distal end 26 of the rib portion. The projections 29a and 29b are able to flex apart to allow installation of a wire outboard reinforcing member 40 into the position shown in FIG. 7b. Bead 28 can then be formed to close the mouth between projections 29a and 29b either through a welding process, a solvent fusing process or a gluing process for instance.

In FIG. 7d, the open mouth opens laterally. Again, the open mouth can be sealed either by gluing, fusing or welding.

Figure 7E:
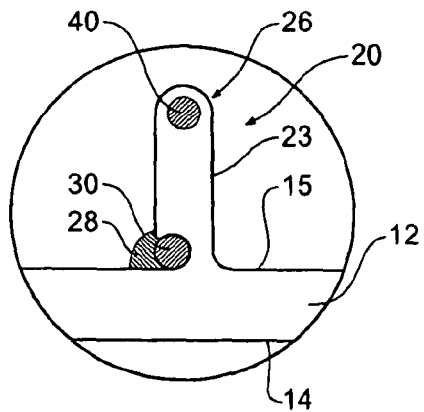
Figure 7F:
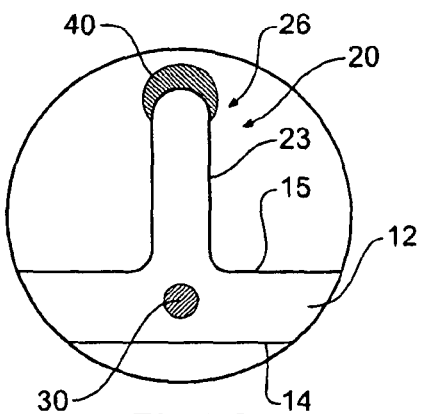

FIG. 7e shows a further variant of the rib portion 20 in which the inboard reinforcing member 30 is installed subsequent to extrusion of the base 12.

Figure 7G:
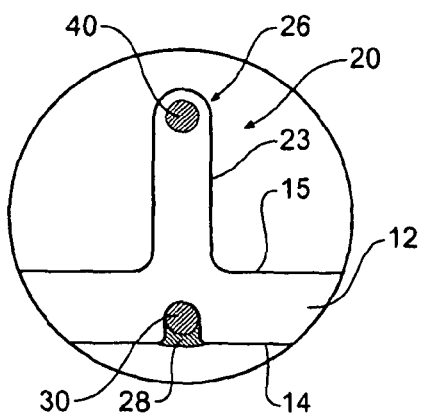
Figure 7H:
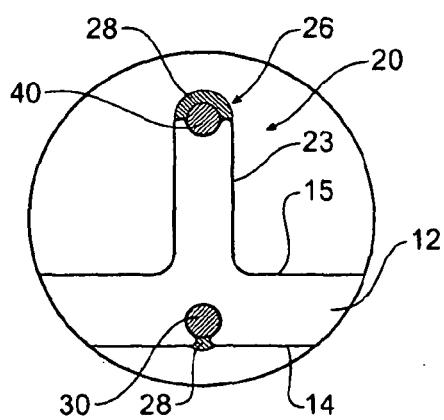

In FIGS. 7g and 7h, further variants are shown where the inboard reinforcing members 30 are installed subsequent to extrusion of the plastic strip 11 and where the reinforcing member 30 is installed from the underside or inside of the plastic strip 11.

FIG. 7f shows a further variant of the composite rib portion 20 where the outboard reinforcing member 40 is high strength polymer that is welded, glued or co-extruded onto the distal end 26 of the composite rib portion 20.

The dimensions and shapes of the plastic strip 12, the reinforcing elements 30 and 40, and the intermediate plastic rib portions 23 can be varied to suit the diameter of the pipe to be wound. For example, a composite strip of the type shown in FIG. 7a may have reinforcing members 30 and 40 made from wire 1.25 mm in diameter. In some applications wire diameters of 0.8 mm or less may be appropriate or for composite strips for use in large diameter pipes, much thicker wires, perhaps of several millimetres in diameter may be used. Various grades of wire can be made. Rib heights can vary and may typically be between 5 mm and 40 mm (although in some applications smaller or larger rib heights will be appropriate).

Now referring to FIG. 9, a further embodiment of the invention is illustrated. In this embodiment, first and second elongate outboard reinforcing members 42 and 44 are positioned laterally offset to first and second sides respectively of a plane p-p bisecting the rib portion 20 perpendicular to the base 12. With this arrangement, the composite rib portion 20 is stabilised. Should the composite rib portion 20 bend laterally to one side, then the tension in the reinforcing member on the opposite side will tend to straighten the composite rib portion 20 as the composite strip 10 is wound into a pipe or curved about an axis lateral to and below the base portion 12.

Referring now to FIGS. 10a, 10b, 10c and 10d, enlarged views are shown of further variants of the composite rib area 20. With these further variants, a reinforcing strip 100 is included in the composite strip portion 23. The reinforcing strip 100 is of the type described in the applicant's earlier above-referenced patent application AU2003227090. In some applications, it may be preferable to wind a helical pipe having just the reinforcing strip 100, as described in the aforementioned patent application AU2003227090, and then subsequently adding inboard and outboard reinforcing members 30 and 40 as illustrated in any one of FIGS. 10a, 10b, 10c and 10d.

As should be apparent from the above description, the composite rib portion 20 can be formed in many ways so as to create a composite strip having a composite rib portion where an inboard reinforcing member is disposed within or adjacent to the base portion and an outboard reinforcing member is disposed within the distal end of the rib portion with an intermediate plastic web portion extending between the inboard and outboard reinforcing members. Optionally, a further reinforcing member in the form of a strip 100 may also be included within or adjacent to the plastic web portion of the composite rib portion 23.

Methods of installing or joining the reinforcing members to the plastic strip 11 include but are not limited to: crosshead extrusion, welding using resistance heating, welding using a laser, solvent fusing, gluing and/or mechanical attachment (for example clipping). The plastic strip can be extruded from PVC, or polyethylene (including high density polyethylene for instance). Where PVC is used, solvent fusing may be preferable to welding in many applications.

Figure 5:
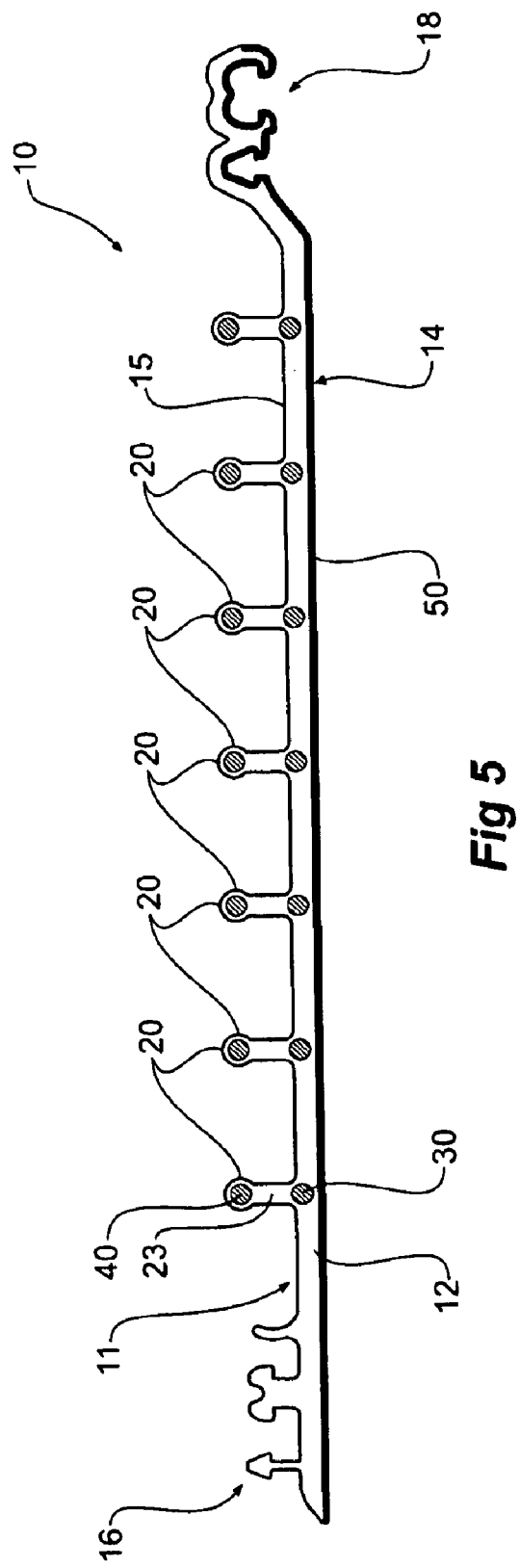
FIG. 5 is a cross-sectional view of a composite strip according to a further alternative embodiment of the invention, of the strip having a base reinforcing the portion.
Figure 6:
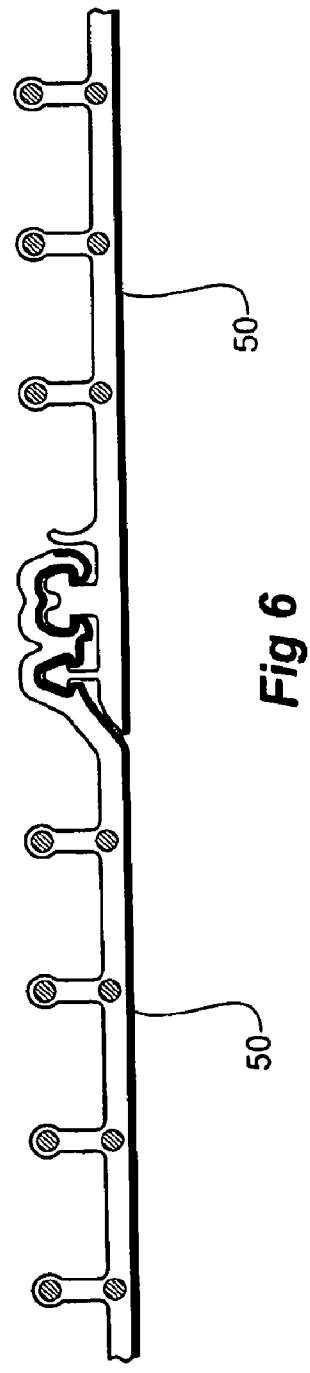
FIG. 6 is similar view to that of FIG. 5 but shows adjacent profiles interlocking.

The addition of the reinforcing members 30 and 40 to the plastic strip 12 can also assist in improving the pressure rating of the pipe. The composite strips described above can further incorporate other elements to improve the pressure rating of the wound pipe. For instance, lamina of fibre fabric (eg glass fibre), plastic or steel may be provided to improve the pressure rating of the pipe. Any material having a Young's modulus and strength that exceeds that of the plastics material of the strip can be used. The lamina may be incorporated into the profile (strip 12) in any suitable way. For instance, the lamina may be welded to the base of the strip 12 or may be cross-head extruded into the base of the strip 12 to provide a strip 10 as shown in FIGS. 5 and 6.

Improved interlocking edge features may also be provided to enhance the pressure rating of the pipe. Examples of profiles constructed for high-pressure applications are shown in FIGS. 5 and 6. A mechanical lock is provided by a male edge member 16 and a female edge member 18 formed from the plastic strip 11. This profile is cross head extruded encapsulating the reinforcing members 30 and 40 as the composite strip 10 is produced obviating the need to add a sealing bead as previously described. A lamina 50 is incorporated into the base portion of the strip 11. The lamina 50 has a higher Young's modulus and strength than the PVC plastic strip 11. When wound into a helical pipe, this profile can provide a high pressure pipe suitable for conveying fluids under pressure. Although adjacent convolutions are not directly bonded bound together, the thickness of the plastic and design of the mechanical lock formed by adjacent edges 16 and 18 ensures that the pipe is able to withstand significant internal pressures.

Other embodiments of the invention may be provided with the lamina either bonded to the base of the strip 12 or embedded within the base of the strip 12.

Materials having directional properties may be used as or within the lamina. For instance, orientated plastic film strips that are strong in a longitudinal direction and weak in a transverse direction may be used. Such strips may improve the "hoop" strength of the wound pipe.

Plastic film strips that are strong in a transverse direction and weak in a longitudinal direction may also be used.

In some applications it will be desirable to form a lamina from two (or more) plastic film strips that are strong in mutually orthogonal directions thereby resulting in a composite of high strength in all directions.

Examples of suitable materials having directional properties include highly stretched polyolefin sheet. Such sheets have a high proportion of molecules orientated in the same direction which provides a high Young's modulus and yield strength.

The applicant's Australia Patent No. AU2003227090 titled "Composite Strip Windable To Form A Helical Pipe And Method Therefor" discloses other composite strip and composite pipe features together with methods of producing pipe. These features and methods could be used with the present invention and the disclosure of AU2003227090 is herewith incorporated in its entirety into this specification.

More generally, various percentages of short fibres with a high e modulus—(for instance glass fibres) can be dispersed through out the entire profile to provide improved performance. The incorporation of such fibres may improve the tensile strength of the composite strip and may improve the pressure rating of a pipe wound from such strips.

The various composite strips described and illustrated above can be manufactured in a variety of ways. In particular, the reinforcing members can be added during the extrusion process (crosshead extrusion), after the extrusion process but before winding the composite strip on to a spool, during the spooling process, during the pipe winding process or after the pipe winding process.

Depending on the application, the pipe winding process can be underground within a pipe to be rehabilitated, above-ground on a construction site or in a pipe production factory.

As should be clear from FIGS. 7a to 7f, the inboard and outboard reinforcing members can be added at various points separately or together in the manufacturing processes up to and including post installation. For example, the inboard reinforcing member may be added at the extrusion stage via a crosshead extrusion process and the outboard reinforcing member may be added during or after the process of winding the composite strip 10 into a pipe 70.

Figure 8A:
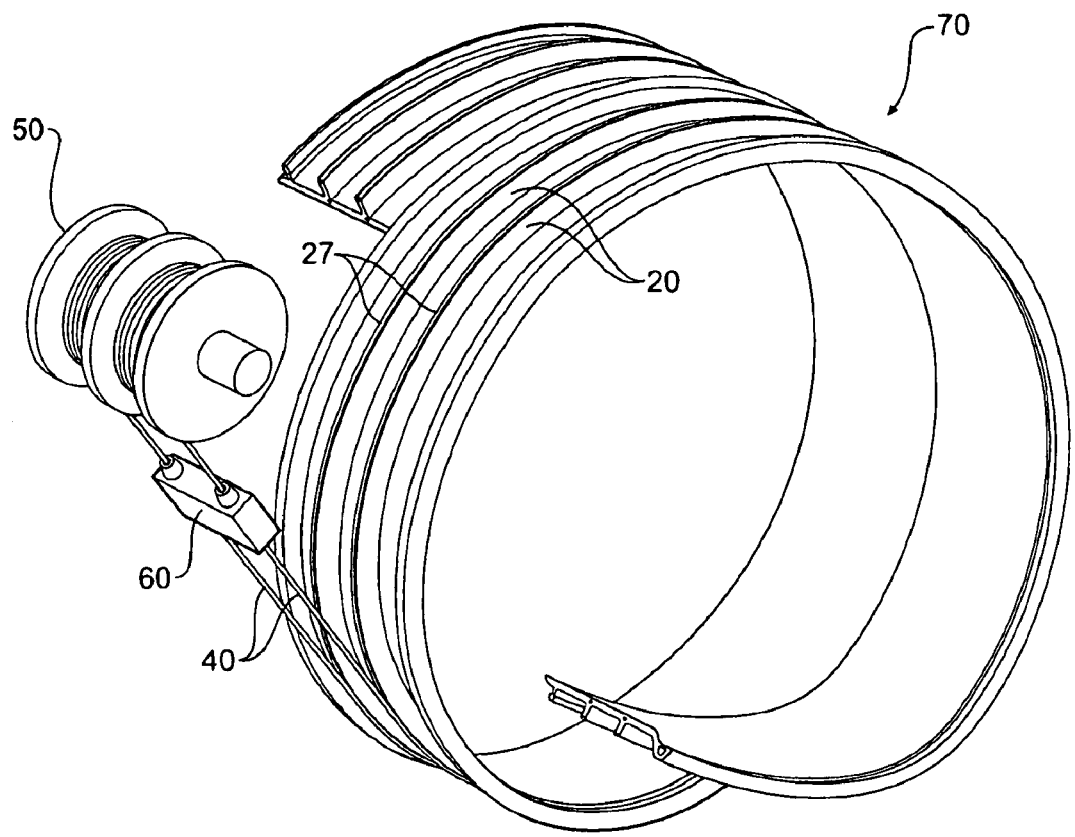
FIG. 8a is a diagrammatic isometric view showing a composite strip being wound into a pipe in accordance with the further aspect of the invention.
Figure 8B:
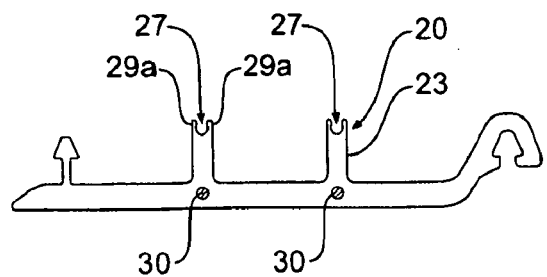

Referring now to FIGS. 8a and 8b, a process whereby an outboard reinforcing member 40 in the form of a wire is added to the composite strip 10 during the pipe winding process is illustrated schematically. A pair of wire spools 50 are provided to feed wires 40 into grooves or slots 27 formed at the top of the rib portions 20.

In some applications it may be advantageous to add the wire at the spooling stage. For instance, with some rehabilitation projects, the addition of the wire on site might be too difficult.

Adding the wire at the spooler in some applications may be better than simply adding through cross head extrusion, as the strip is already bent, and therefore less stress is introduced into the strip which might ultimately either limit its use, or mean the size of the inner diameter of the spool needs to be increased thereby reducing the capacity of the spool (which then increases freight costs).

Optionally, a tensioner 60 may be provided so that the wire 40 is pre-tensioned. This results in a prestressed pipe 70 where the outer reinforcing members (wire) 40 are in tension and the inner reinforcing members are in compression.

Advantageously, the projections 29a and 29b are shaped with a lead-in as illustrated in FIG. 8b. This lead-in, together with the flexibility of the projections 29a and 29b, allow the wires to snap into place when they are tensioned. Once firmly held in grooves 27, a bead may be added to seal the reinforcing member from the embodiment (may be desirable for steel wire for instance)

Adding the outboard reinforcing member after or even during the pipe winding process as described above and is illustrated in FIG. 8a provides a number of significant advantages. Without either or both reinforcing member or members being in position at the point of winding the pipe, the forces are greatly reduced. This facilitates the winding process. Furthermore, with the process illustrated in FIG. 8a and described above, very high composite strip enhanced pipe stiffness can be achieved because the pipe has already been formed and therefore it is not necessary to design the completed composite strip for windability.

Not adding either or both of the reinforcing members before spooling may allow an increase in the length of strip wound per spool as it is possible to commence spooling at a lower diameter.

In some applications, it can be advantageous to wind pipe directly after the production of the composite strip 10 without the intermediate step of spooling the composite strip. With the various embodiments of the invention described above, particularly those employing wire, whether stranded or unstranded, it is more cost efficient to run a continuous pipe making process. This is because very long lengths of wire are readily commercially available and so long lengths of pipes can be made in a continuous process without the need to employ labour to join the wire (reinforcing member). This continuous process can provide significant additional benefits including a reduction in inventory as compared to the process for winding a pipe employing reinforcing members in strip form (such as that described in the Applicant's earlier Patent Application AU2003227090 refer to above).

While the present invention has been described in terms of preferred embodiments in order to facilitate better understanding of the invention, it should be appreciated that various modifications can be made without departing from the principles of the invention. Therefore, the invention should be understood to include all such modifications within its scope.

The claims defining the invention are as follows:

1. A composite strip windable to form a helical pipe for transporting fluid, the composite strip comprising:
   an elongate plastic strip having a base portion, the base portion having a lower side defining an inner face and an upper side defining an outer face, the inner face having a substantially flat transverse cross-section;
   at least one lengthwise extending rib portion upstanding from the outer face of the base portion, the rib portion having a distal end remote from the base portion;
   an elongate inboard reinforcing member disposed within or adjacent to the base portion;
   an elongate outboard reinforcing member disposed within the distal end of the rib portion parallel to the inboard reinforcing member; and
   an elongate intermediate plastic web portion extending between the inboard and outboard reinforcing members, the web portion together with the inboard and outboard reinforcing members forming a composite rib portion,
   wherein, when wound into a helical pipe, the composite rib portion reinforces the pipe against radial crushing loads.

2. The strip as claimed in claim 1 wherein the outboard reinforcing member is constructed from a material having a higher Young's Modulus than that of the plastic strip and wherein the inboard reinforcing member is constructed from a material having a higher Young's Modulus than that of the plastic strip.

3. The strip as claimed in claim 1 wherein the inboard and outboard reinforcing members are completed encapsulated.

4. The strip as claimed in claim 1 wherein the reinforcing members are stranded or non-stranded filaments.

5. The strip as claimed in claim 4 wherein the reinforcing members are wire.

6. The strip as claimed in claim 1 wherein the composite strip includes a plurality of lengthwise extending composite rib portions upstanding from the outer face of the base portion.

7. The strip as claimed in claim 1 wherein the composite strip includes connecting formations on opposite edges thereof, the connecting formations adapted to interlock when the strip is wound in a helical path and adjacent edge portions of the strip overlap one another.

8. The strip as claimed in claim 7 wherein, for each composite rib portion, a distance measured from the inner face of the strip upwards to a distal end of the composite rib portion is no greater than a distance measured from the inner face of the strip upwards to an apex of the connecting formations.

9. The strip as claimed in claim 1 having first and second elongate outboard reinforcing members disposed within the distal end of the rib portion positioned laterally offset to first and second sides respectively of a plane bisecting the rib portion perpendicularly to the base.

10. A composite strip windable to form a helical pipe for transporting fluid, the composite strip comprising:
    an elongate plastic strip having a base portion, the base portion having a lower side defining an inner face and an upper side defining an outer face;
    at least one lengthwise extending rib portion upstanding from the outer face of the base portion, the rib portion having a distal end remote from the base portion;
    an elongate inboard reinforcing member disposed within or adjacent to the base portion;
    first and second elongate outboard reinforcing members disposed within the distal end of the rib portion parallel to the inboard reinforcing member and positioned laterally offset to first and second sides respectively of a plane bisecting the rib portion perpendicularly to the base; and
    an elongate intermediate plastic web portion extending between the inboard and outboard reinforcing members, the web portion together with the inboard and outboard reinforcing members forming a composite rib portion,
    wherein, when wound into a helical pipe, the composite rib portion reinforces the pipe against radial crushing loads.

11. The strip as claimed in claim 10 wherein the outboard reinforcing member is constructed from a material having a higher Young's Modulus than that of the plastic strip and wherein the inboard reinforcing member is constructed from a material having a higher Young's Modulus than that of the plastic strip.

12. The strip as claimed in claim 10 wherein the inboard and outboard reinforcing members are completed encapsulated.

13. The strip as claimed in claim 10 wherein the reinforcing members are stranded or non-stranded filaments.

14. The strip as claimed in claim 13 wherein the reinforcing members are wire.

15. The strip as claimed in claim 10 wherein the composite strip includes a plurality of lengthwise extending composite rib portions upstanding from the outer face of the base portion.

16. The strip as claimed in claim 10 wherein the composite strip includes connecting formations on opposite edges thereof, the connecting formations adapted to interlock when the strip is wound in a helical path and adjacent edge portions of the strip overlap one another.

17. The strip as claimed in claim 16 wherein, for each composite rib portion, a distance measured from the inner face of the strip upwards to a distal end of the composite rib portion is no greater than a distance measured from the inner face of the strip upwards to an apex of the connecting formations.

18. A pipe comprising a helically wound composite strip, the composite strip comprising:
   an elongate plastic strip having a base portion, the base portion having a lower side defining an inner face and an upper side defining an outer face, the inner face having a substantially flat transverse cross-section;
   at least one lengthwise extending rib portion upstanding from the outer face of the base portion, the rib portion having a distal end remote from the base portion;
   an elongate inboard reinforcing member disposed within or adjacent to the base portion;
   an elongate outboard reinforcing member disposed within the distal end of the rib portion parallel to the inboard reinforcing member; and
   an elongate intermediate plastic web portion extending between the inboard and outboard reinforcing members, the web portion together with the inboard and outboard reinforcing members forming a composite rib portion,
   wherein the composite rib portion reinforces the pipe against radial crushing loads.

19. The pipe as claimed in claim 18 wherein the composite strip has first and second elongate outboard reinforcing members disposed within the distal end of the rib portion positioned laterally offset to first and second sides respectively of a plane bisecting the rib portion perpendicularly to the base.

20. A method of producing a pipe comprising the steps of:
   a) extruding an elongate plastics strip, the strip having a base portion, the base portion having a lower side defining an inner face and an upper side defining an outer face, and at least one lengthwise extending rib portion upstanding from the outer face of the base portion;
   b) introducing a lower reinforcing member into the base portion of the strip in a position adjacent to the at least one rib portion so as to form a sub-assembled composite strip;
   c) winding the sub-assembled composite strip into a spool of strip or into a helically wound pipe;
   d) introducing an upper reinforcing member into a top portion of the at least one rib portion so as to form an assembled composite strip,
   whereby the step of introducing a lower reinforcing member occurs during or after the extruding step but before the winding step and whereby the step of introducing the upper reinforcing member occurs during or after the winding step.

21. The method as claimed in claim 20 wherein the extruding and the introducing step b) occur together in a cross-head extrusion die.

22. The method as claimed in claim 20 wherein the winding step c) comprises winding the sub-assembled composite strip into a pipe.

23. The method as claimed in claim 22 wherein the introducing step d) includes tensioning the outer reinforcing member such that the pipe is prestressed.

24. The method as claimed in claim 20 further comprising the step of sealing the upper reinforcing member within the top portion of the at least one rib.

25. A method of producing a pipe comprising the steps of:
   a) extruding an elongate plastics strip, the strip having a base portion, the base portion having a lower side defining an inner face and an upper side defining an outer face, and at least one lengthwise extending rib portion upstanding from the outer face of the base portion, the rib portion having a distal end remote from the base portion;
   b) introducing a lower reinforcing member into the base portion of the strip in a position adjacent to the at least one rib portion so as to form a sub-assembled composite strip;
   c) bending the composite strip about an axis transverse to the base;
   d) introducing an upper reinforcing member into the distal end of the at least one rib portion so as to form an assembled composite strip,
   whereby the step of introducing a lower reinforcing member occurs during or after the extruding step but before the bending step and whereby the step of introducing the upper reinforcing member occurs during or after the bending step.

26. A method of producing a pipe comprising the steps of:
   a) extruding an elongate plastics strip, the strip having a base portion, the base portion having a lower side defining an inner face and an upper side defining an outer face, and at least one lengthwise extending rib portion upstanding from the outer face of the base portion, the rib portion having a distal end remote from the base portion;
   b) introducing a first reinforcing member into either of: the base portion of the strip in a position adjacent to the at least one rib portion, or the distal end of the at least one rib portion so, as to form a sub-assembled composite strip;
   c) bending the composite strip about an axis transverse to the base;
   d) introducing a second reinforcing member into the other of: the base portion of the strip in a position adjacent to the at least one rib portion, or the distal end of the at least one rib portion so as to form an assembled composite strip,
   whereby the step of introducing a first reinforcing member occurs during or after the extruding step and whereby the step of introducing the second reinforcing member occurs during or after the bending step.

* * * * *

UNITED STATES PATENT AND TRADEMARK OFFICE
CERTIFICATE OF CORRECTION

| | |
|---|---|
| PATENT NO. | : 7,975,728 B2 |
| APPLICATION NO. | : 11/988636 |
| DATED | : July 12, 2011 |
| INVENTOR(S) | : Melville et al. |

It is certified that error appears in the above-identified patent and that said Letters Patent is hereby corrected as shown below:

On the title page:
item (57) ABSTRACT

Line 7, delete the numeral "23" and insert --26--.

Line 10, delete the numeral "40".

Line 11, after the word "member" insert --40--.
Line 11, delete the numeral "20" and insert --26--.

Line 13, after the word "web" delete the numeral "23" and after the word "portion" insert the numeral --23--.

Column 1, line 37, delete "tions" and insert --tion--.

Column 2, line 17, delete "plastics" and insert --plastic--.
             line 19, delete "plastics" and insert --plastic--.
             line 24, delete "plastics" and insert --plastic--.
             line 36, delete "plastics" and insert --plastic--.
             line 67, delete "completed" and insert --completely--.

Column 3, line 49, delete "completed" and insert --completely--.

Column 4, line 26, delete "plastics" and insert --plastic--.
             line 54, delete "plastics" and insert --plastic--.

Column 5, line 7, delete "plastics" and insert --plastic--.

Column 6, line 22, delete "reinforcing 40 member" and insert --reinforcing member 40--.

Signed and Sealed this
Third Day of July, 2012

David J. Kappos
*Director of the United States Patent and Trademark Office*

CERTIFICATE OF CORRECTION (continued)
U.S. Pat. No. 7,975,728 B2

Column 7, line 58, delete "modulus" and insert --Modulus--.
line 60, delete "modulus" and insert --Modulus--.

Column 9, line 51, delete "eg" and insert --e.g.--.
line 53, delete "modulus" and insert --Modulus--.

Column 10, line 3, delete "modulus" and insert --Modulus--.
line 7, delete the word "bound".
line 28, delete "modulus" and insert --Modulus--.

Column 11, line 23, after "instance)" insert --.--.
line 53, delete "refer" and insert --referred--.

Claim 3, column 12, line 22, delete "completed" and insert --completely--.

Claim 12, column 13, line 8, delete "completed" and insert --completely--.